(12) United States Patent
Kolof (10) Patent No.: US 10,303,638 B2
(45) Date of Patent: May 28, 2019

(54) METHOD OF DATA ACQUISITION AND APPARATUS FOR DATA ACQUISITION

(71) Applicant: Infineon Technologies AG, Neubiberg (DE)

(72) Inventor: Andreas Kolof, Unterhaching (DE)

(73) Assignee: Infineon Technologies AG, Neubiberg (DE)

(*) Notice: Subject to any disclaimer, the term of this patent is extended or adjusted under 35 U.S.C. 154(b) by 1356 days.

(21) Appl. No.: 14/328,968

(22) Filed: Jul. 11, 2014

(65) Prior Publication Data

US 2016/0011574 A1 Jan. 14, 2016

(51) Int. Cl.
*G06F 13/40* (2006.01)

(52) U.S. Cl.
CPC .................. *G06F 13/4068* (2013.01)

(58) Field of Classification Search
CPC .......................... G05B 15/02; G06F 13/4068; H04L 7/0278; H04L 25/4902; H04L 7/10
See application file for complete search history.

(56) References Cited

U.S. PATENT DOCUMENTS

| | | | | |
|---|---|---|---|---|
| 2,700,155 A * | 1/1955 | Oswald | ............... | G11B 20/1419 178/70 R |
| 4,429,384 A * | 1/1984 | Kaplinsky | ............. | G06F 13/374 340/12.16 |
| 6,608,571 B1 * | 8/2003 | Delvaux | ............. | G06F 13/4295 341/53 |
| 7,826,525 B2 * | 11/2010 | Mignone | ............. | H04L 25/4906 375/237 |
| 8,183,982 B2 | 5/2012 | Scherr | | |
| 9,030,266 B2 * | 5/2015 | Kanasugi | ................. | H04B 3/30 333/12 |
| 9,667,409 B2 * | 5/2017 | Scherr | ................... | H04L 5/1484 |
| 2001/0010187 A1 * | 8/2001 | Ishii | ..................... | G10H 1/0066 84/609 |
| 2008/0204172 A1 * | 8/2008 | Sakai | ...................... | H04B 3/30 333/22 R |

(Continued)

FOREIGN PATENT DOCUMENTS

DE 102008031498 A1 1/2010

OTHER PUBLICATIONS

ISO11898-1, titled "International Standard ISO 11898-1, Road vehicles—Controller area network (CAN)—Part 1:Data link layer and physical signalling", (ISO118981 hereinafter) was published as Reference No. ISO 11898-1:2003(E), pp. 01-52.*

(Continued)

*Primary Examiner* — Andrew Lai
*Assistant Examiner* — Hoyet H Andrews, III
(74) *Attorney, Agent, or Firm* — Murphy, Bilak & Homiller, PLLC (57) ABSTRACT

Disclosed herein are techniques including a method for data acquisition in a system having a plurality of data acquisition units and a controller coupled to the plurality of data acquisition units by a pair of wires. The method includes providing a resistive element controllable to change resistance between the pair of wires, distributing a control load across a plurality of signal frames, and broadcasting the plurality of signal frames. A controller is disclosed for coupling to a plurality of data acquisition units. Further, a system for data acquisition is also disclosed.

21 Claims, 4 Drawing Sheets

(56) References Cited

U.S. PATENT DOCUMENTS

| | | | | |
|---|---|---|---|---|
| 2010/0002821 A1* | 1/2010 | Hammerschmidt | ...... | H04L 7/10 375/360 |
| 2014/0169495 A1* | 6/2014 | Lesbats | ............ | H03K 19/00361 375/295 |
| 2016/0041941 A1* | 2/2016 | Kessler | .................. | H04B 3/542 700/3 |

OTHER PUBLICATIONS

ISO11898-1, titled "International Standard ISO 11898-1, Road vehicles—Controller area network (CAN)—Part 1:Data link layer and physical signaling", (ISO118981 hereinafter) was published as Reference No. ISO 11898-1:2003(E), pp. 01-52, was prepared by Technical Committee ISO/TC 22. (Year: 2003).*
Unknown, "SENT (protocol)", Wikipedia.com, http://en.wikipedia.org/w/index.php?oldid=598027492, pp. 1-2.

* cited by examiner

METHOD OF DATA ACQUISITION AND APPARATUS FOR DATA ACQUISITION

TECHNICAL FIELD

Embodiments disclosed herein relate to data acquisition. Some techniques relate to a method of data acquisition. Some techniques relate to an apparatus for data acquisition.

BACKGROUND

Usually, an electrical system, such as the electrical system in an automobile, includes one or more controllers, memory chips, sensor circuits, and actor circuits. In many applications microprocessors are used to process signal data. Sensor systems can be configured to feed signals to the microprocessor. A typical sensor system may encompass one or more sensors and may form an electrical system that includes a number of different components that communicate with one another to perform system functions. The different components may be situated on the same integrated circuit chip or on different integrated circuit chips. The controller digitally communicates with the memory chips, sensors, and actors to control operations in the automobile. Each sensor is communicatively coupled to the microprocessor in order to communicate a signal that the sensor detected to the microprocessor. Given that sensors typically are employed in a dynamic environment where changes take place that may give rise to changes in signals detected by the sensor, communication between sensor and microprocessor can be technically more challenging than in a steady environment.

Some applications may require particularly efficient use of hardware in order to minimize a bulk or volume of hardware exposed to effects such as heat, vibration, electromagnetic emission and others that may negatively impact the lifetime of the hardware or the quality of communication that uses the hardware. The protocol employed for signal communication should provide robust communication vis-à-vis interference, for example, from electromagnetic emissions of electrical equipment operated nearby.

SUMMARY

The following presents a simplified summary in order to provide a basic understanding of one or more aspects of techniques disclosed herein. This summary is not an extensive overview, and it is neither intended to identify key or critical elements, nor to delineate the scope of this disclosure. Rather, the primary purpose of the summary is to present some concepts in a simplified form as a prelude to the more detailed description that is presented later.

This disclosure is directed to techniques of data acquisition in a system having a plurality of data acquisition units and a controller coupled to the plurality of data acquisition units. The techniques can encompass coupling the controller to the plurality of data acquisition units by a pair of wires. As an example, the techniques can be applied in an automotive environment.

This summary is submitted with the understanding that it will not be used to interpret or limit the scope or meaning of the claims. Those skilled in the art will recognise additional features and advantages upon reading the following detailed description, and upon viewing the accompanying drawings.

BRIEF DESCRIPTION OF THE DRAWINGS

The claimed subject matter is described below with reference to the drawings. For purposes of explanation, numerous specific details are set forth in order to provide a thorough understanding of the claimed subject matter. The drawings illustrate embodiments and together with the description serve to explain principles of embodiments. Other embodiments and many of the intended advantages of embodiments will be readily appreciated as they become better understood by reference to the following detailed description. It may be evident, however, that the claimed subject matter may be practised without these specific details. It is to be understood that the features of the various embodiments described herein may be combined with each other, unless specifically noted otherwise. The detailed description references the accompanying figures. The elements of the drawings are not necessarily to scale relative to each other. Like reference numerals designate corresponding similar parts, like features and components. Where multiple embodiments are described, multi-digit reference numerals are used to denote elements in the embodiments. In multi-digit reference numerals the least significant digits can designate features and components that are alike in the different embodiments, whereas the most significant digit can designate the specific embodiment illustrated by the referenced figure.

DETAILED DESCRIPTION

Described herein are embodiments that relate to processing signals and/or data in a system according to techniques disclosed herein. For purposes of explanation, numerous specific details are set forth in order to provide a thorough understanding of the claimed subject matter. It may be evident, however, that the claimed subject matter may be practised without these specific details.

Figure 1:
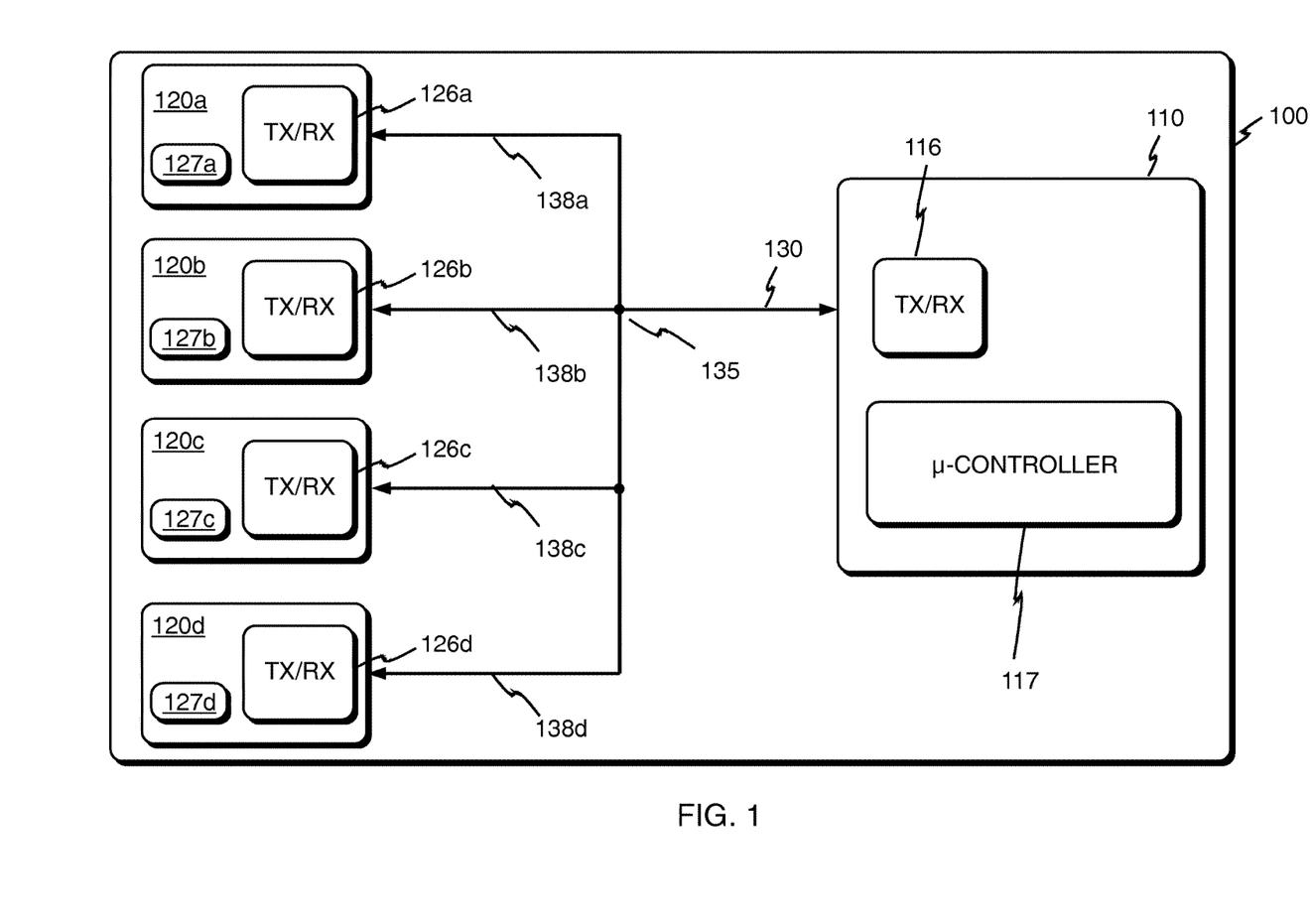
FIG. 1 is a block diagram that illustrates a system configured according to some embodiments to implement techniques disclosed herein.

FIG. 1 illustrates a system 100 configured according to some embodiments to implement techniques disclosed herein. In some implementations system 100 is part of an automobile's electrical system and/or system 100 is part of an automobile's data communication system. According to some exemplary embodiments system 100 includes a number of sensor units $120a, \ldots, 120d$ that are communicatively coupled to a controller unit 110 via one or more communication paths 130. In some implementations sensor units $120a, \ldots, 120d$ communicatively couple to more than a single controller unit 110. In one embodiment sensor units $120a, \ldots, 120d$ form part of one or more integrated circuit chips. In some embodiments controller unit 110 is part of another integrated circuit chip. In one embodiment, sensor units $120a, \ldots, 120d$ and controller unit 110 are part of the same integrated circuit chip. In one embodiment, sensor units $120a, \ldots, 120d$ include an actor, such as a relay circuit. In one embodiment, sensor units $120a, \ldots, 120d$ include another controller. In other embodiments, sensor units 120a, . . . , 120d and controller unit 110 are any suitable components.

It should be understood that, while four sensor units 120a, . . . , 120d are shown in FIG. 1, this number is merely for the purpose of illustration and system 100 can be configured to operate with any other number of sensor units. According to some embodiments, system 100 can be configured to be flexible, at least up to a design limit, with regards to the number of sensor units 120a, . . . , 120d actually communicatively coupled to and/or operated by controller unit 110. According to some embodiments sensor units 120a, . . . , 120d, at least to the extent of relevance to the techniques disclosed herein, are all alike. Accordingly, herein reference will henceforth be made to an individual exemplary sensor unit using reference numeral 120 alone while omitting the suffix-letter. It should be understood that, despite the reference to a single sensor unit 120, more than a single sensor unit 120 can be coupled to controller unit 110, unless explicitly stated otherwise. Likewise suffix-letters of numerals referencing components of sensor unit 120 will be omitted. It should also be understood that in some implementations system 100 comprises a variety of sensor units 120 according to different embodiments disclosed herein.

Sensor unit 120 is configured to collect data. Herein, the wording 'collecting data' means detecting and/or measuring a physical quantity and converting the measurement into a signal representative of the detected quantity. For example, a physical quantity can be an acceleration, a pressure of gas, air, fluid etc., a temperature, a mechanical position such as throttle position and swirl flap position. According to some embodiments, sensor unit 120 comprises a transducer 127 to detect the physical quantity and to provide an electrical signal that represents the physical quantity as measured. In some implementations the representing signal is a voltage signal. In some implementations the representing signal is a current signal. According to some embodiments the wording 'collecting data' can encompass further to digitize the signal by analog-to-digital conversion, so as to obtain a digital signal, wherein the digital signal digitally represents the measured physical quantity. In some of these embodiments transducer 127 includes an analog-to-digital converter. Accordingly, in some embodiments transducer 127 outputs a digital representation of measured physical value(s). Further, some embodiments also include an encryption functionality configured to encrypt the digital representation of measured values prior to output from transducer 127. Further, in some implementations transducer 127 is configured to output sensor status information. In some implementations transducer 127 outputs control bits such as stuffing bits, cyclic redundancy check (CRC) bits, and cryptographic key bits. In some embodiments transducer 127 is configured to provide a smoothing functionality or a linearization functionality, for example, to 'soften' bumps and/or errants detected in a measured physical quantity. In some embodiments transducer 127 is configured to receive data. In particular, transducer 127 can be configured to receive control data such as trigger data indicative of a request or command to detect and/or sample and/or output data. In some embodiments control data encompass sensor configuration data, e.g. pressure data, temperature data, sensor current consumption data, and unit data such as a dimension of a voltage to be communicated being volt, kilovolt or millivolt.

Further, sensor unit 120 is configured to communicate with controller unit 110. Accordingly, in some embodiments sensor unit 120 includes sensor transmitter and/or transmitter receiver circuitry configured to transmit and/or to receive signals. Reference will henceforth be made briefly to sensor transceiver 126, while it should be understood that, as the case may be, some implementations provide only transmitter functionality while other implementations only provide receiver functionality. In particular, sensor unit 120 is configured to receive control signals from controller unit 110. Sensor unit 120, and more particularly, sensor transceiver circuitry 126, is communicatively coupled to controller unit 110. According to some embodiments sensor unit 120 is adapted to provide signalling, in particular data signalling, to controller unit 110.

Controller unit 110 is configured to communicate with sensor unit 120. Accordingly, in some embodiments controller unit 110 includes controller transmitter and/or controller receiver circuitry configured to transmit and/or to receive signals. Reference will henceforth be made briefly to controller transceiver 116, while it should be understood that, as the case may be, some implementations provide only transmitter functionality while other implementations only provide receiver functionality. In particular, controller unit 110 is configured to receive data from sensor unit 120. Controller unit 110, and more particularly, controller transceiver 116, is communicatively coupled to sensor unit 120. According to some embodiments controller unit 110 is adapted to provide signalling, in particular control signalling, to sensor unit 120. It should be understood that, further, controller unit 110 can be configured to couple via a communication medium (not shown) such as wireline, wireless, optical fibre, to devices other than sensor unit 120 as the case may be, for example, to another controller unit (not shown). It should also be understood that, according to some embodiments, the configuration of controller unit 110 provides for coupling by different media, for example, in parallel or depending on upstream and downstream communication. According to some implementations, controller unit 110 is configured to be communicatively coupled to a communication network such as controller area network (CAN), a local area network (LAN) and the like.

According to some embodiments, controller unit 110 includes a microcontroller 117 configured to process data. It should be understood that according to some implementations other hardware than a microcontroller 117 can provide functionality of controller unit 110 or equivalent functionality to the extent that the functionality of microcontroller 117 is relevant to the techniques disclosed herein. For example, a field programmable logic array (FPGA) device, a digital signal processor (DSP) or a state machine coupled to sensor unit 120 and configured to perform steps as the techniques disclosed herein could take the place of exemplary microcontroller 117. Likewise, a general purpose computer, in particular when comprising or coupled to a storage medium that stores instructions that, when executed by the general purpose computer, perform steps of the techniques disclosed herein, or equivalent steps, can take the place of microcontroller 117.

Communication path 130 is configured to provide communicative coupling between sensor unit 120 and controller unit 110. Communication path 130 can be provided in a bus arrangement as illustrated in FIG. 1. In some embodiments the communication path is configured in star-like arrangement, wherein a centre device controls traffic in the arrangement of the communication path. wherein controller unit 110 includes or otherwise provides a node for branches of communication path 130, or, according to some embodiments as illustrated in FIG. 1, communication path 130 include a node 135 external to controller unit 110, whence communication bus branches 138a, . . . , 138d of communication path 130 each couple an associated sensor unit 120 to controller unit 110. It should be understood that communication path 130 is merely an exemplary communication path to provide communication functionality between controller unit 110 and sensor unit 120, and another communication path than communication path 130 can be contemplated. According to some embodiments, communication path branches 138a, . . . , 138d, at least to the extent of relevance to the techniques disclosed herein, are all alike, and are like the main branch of communication path 130. Accordingly, herein, reference will henceforth be made to one exemplary individual communication bus branch by reference numeral 130 while omitting a reference to any particular structural arrangement of communication path 130 with respect to sensor unit 120, while it should be understood that more than one sensor unit 120 can be coupled, via communication path 130, to controller unit 110. According to some embodiments, communication path 130 is configured for bidirectional communication.

Figure 2:
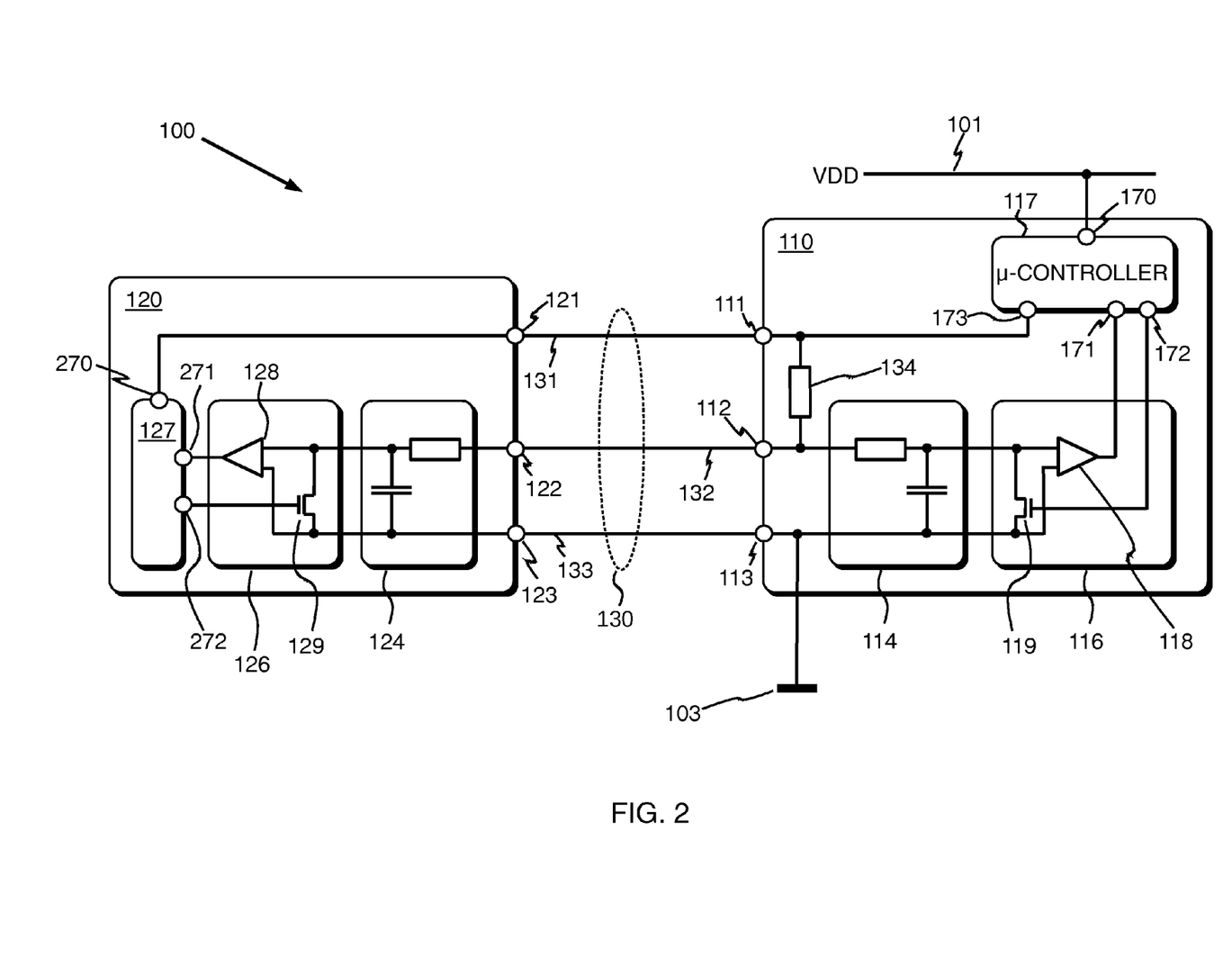
FIG. 2 is a schematic circuit view that illustrates a portion of the system shown in FIG. 1 according to some embodiments.

FIG. 2 illustrates a portion of the system illustrated in FIG. 1 according to some embodiments.

Controller unit 110 comprises an ensemble of terminals configured for interfacing with a coupling to sensor 120. In some embodiments controller unit 110 includes a signal terminal 112 configured to interface with a signal line 132, for example, by way of a connection such as a plug-socket connection. Further, controller unit 110 comprises a supply voltage terminal 111 configured for coupling controller unit 110 to a supply voltage line 131. According to some embodiments, controller unit 110 also comprises a bias terminal 113, configured for coupling to a bias line 133. In some implementations bias terminal 113 is configured to couple to ground 103. In some embodiments controller unit 110 comprises a resistance 134 coupled between supply voltage terminal 111 and signal terminal 112. A first end of resistance 134 is electrically coupled to supply voltage terminal 111. A second end of resistance 134 is electrically coupled to signal terminal 112. In an embodiment resistance 134 is implemented as a discrete element. In one embodiment resistance 134 is implemented as a resistive element formed in an integrated circuit that, according to one implementation, comprises at least a portion of circuitry of controller unit 110. At least one effect of resistance 134 is to 'pull up' voltage on signal line 132. Thus, voltage on signal terminal 112 is kept essentially at the voltage level at supply voltage terminal 111, that herein will also be referred to as HIGH level. However, if signal terminal 112 is switched to connect to bias terminal 113, voltage on signal terminal 112 drops to the level of voltage at bias terminal 113; the bias voltage level will herein also be referred to as LOW level.

Controller unit 110 includes a controller filter arrangement 114 comprising, for example, at least one filter resistor and/or at least one filter capacitive element. The filter resistor, in some embodiments, is parasitic. In some implementations the filter capacitance is parasitic. In some embodiments controller filter arrangement 114 is coupled to the ensemble of voltage supply terminal 111, signal terminal 112, and bias terminal 113 of controller unit 110. At least one effect of controller filter arrangement 114 can be to filter received signals from effects of electromagnetic interference.

Further having regard to controller unit 110, in some embodiments microcontroller 117 includes a supply input terminal 170 that is coupled to supply voltage source 101 and configured to feed power to microcontroller 117 and, according to some implementations, also to other devices that are comprised in or coupled to controller unit 110. Accordingly, in some embodiments microcontroller 117 comprises a supply output terminal 173 that is coupled to supply voltage terminal 121 and configured to set supply voltage terminal 121 at the level of a supply voltage predetermined for operation of system 100. Microcontroller 117 is provided with a data input terminal 171 and a control output terminal 172. Data input terminal 171 is configured to accept data signals corresponding to signalling received at controller unit 110. Control output terminal 172 is configured to transmit control signals corresponding commands issued by microcontroller 117.

Coupled between controller filter arrangement 114 and microcontroller 117 is controller transceiver 116. Some embodiments of controller transceiver 116 include a discrimination device, for example a comparator 118, that is coupled between signal terminal 112 of controller unit 110 and data input terminal 171 of microcontroller 117. At least one effect of comparator 118 can be to discriminate voltage levels in a signal received from signal line 132. Comparator 118 accomplishes this discrimination by comparing the voltage level of the signal at a signal input of comparator 118 to a reference voltage level at a reference input of comparator 118. In some implementations, the reference voltage level is coupled to ground. In some embodiments, the reference input is directly connected to ground 103 and, thus, the reference voltage level is set to ground level. Being able to discriminate different levels of input voltage, comparator 118 can also detect a voltage level change in a signal received from signal line 132. Some embodiments of transceiver 116 include a control device, for example a transistor 119, that has a gate coupled to control terminal 172 a source coupled to signal terminal 112 and a drain coupled to bias terminal 113. Transistor 119 is configured to switch between an OPEN state and a CLOSE state. In the OPEN state transistor 119 forms a resistance between signal terminal 112 and bias terminal 113, whereas in the CLOSE state transistor 119 conductively connects signal terminal 112 to bias terminal 113. In some embodiments transistor 119 is thus configured to switchably electrically separate signal terminal 112 from bias terminal 113, or to essentially short-circuit signal terminal 112 to bias terminal 113 such that signal voltage is effectively pushed down to a bias voltage level present at bias terminal 113. At least one effect can be to control the level of voltage on signal line 132.

To the extent of relevance to techniques disclosed herein, at least according to some embodiments, sensor unit 120 is of a structure that essentially mirrors the structure of controller unit 110 described above with reference to some implementations.

In some embodiments sensor unit 120 comprises an ensemble of terminals configured for interfacing with a coupling to controller unit 110. In some embodiments sensor unit 120 includes a signal terminal 122 configured to interface with a signal line 132, for example, by way of a connection such as a plug-socket connection. Further, sensor unit 120 comprises a supply voltage terminal 121 configured for sensor unit 120 to connect or otherwise couple to a supply voltage line 131. According to some embodiments, sensor unit 120 also comprises a bias terminal 123, configured for coupling to a bias line 133. In some implementations bias terminal 123 is configured to couple to ground 103.

Sensor unit 120 includes transducer 127 configured to detect a signal that, for example, represents a physical quantity to be detected by sensor unit 120. In some embodiments, transducer 127 includes a supply input terminal 270 that is coupled to supply voltage terminal 121 and configured to feed power to transducer 127 essentially as provided to sensor unit 120 via supply voltage terminal 121. According to some embodiments transducer 127 includes a measurement signal output terminal 272 configured to output a signal that represents or otherwise corresponds to a value measured or otherwise detected in respect of a physical quantity to be detected by sensor unit 120. Further, transducer 127 includes a control input terminal 271 that is configured to accept control signals corresponding to signalling received at sensor unit 120.

A sensor filter arrangement 124 comprising, for example, at least one filter resistor and/or at least one filter capacitive element, can be connected to the ensemble of voltage supply terminal 121, signal terminal 122, and bias terminal 123 of sensor unit 120. In some embodiments the filter resistor is parasitic. In some implementations the filter capacitance is parasitic. In some embodiments sensor unit filter arrangement 124 is configured to filter received signals from effects of electromagnetic interference.

According to some implementations sensor unit 120, coupled between sensor filter arrangement 124 and transducer 127 is sensor transceiver 126. Some embodiments of sensor transceiver 126 include a discrimination device, for example a comparator 128, that is coupled between signal terminal 122 of sensor unit 120 and control input terminal 271 of transducer 127. At least one effect of comparator 128 can be to discriminate different levels of signal voltage in a signal received from signal line 132. Accordingly, in some embodiments, comparator 128 can detect a change of voltage level. Some embodiments of sensor transceiver 126 include a control device, for example a transistor 129, that has a gate coupled to measurement signal output terminal 272, a source coupled to signal terminal 122 and a drain coupled to bias terminal 123. Similar to transistor 119, transistor 129 is configured to switch between an OPEN state and a CLOSE state, wherein, in the OPEN state, transistor 129 forms a resistance between signal terminal 122 and bias terminal 123, whereas in the CLOSE state transistor 129 conductively connects signal terminal 122 to bias terminal 123. In some embodiments transistor 129 is thus configured to switchably electrically separate signal terminal 122 from bias terminal 123, or to essentially short-circuit signal terminal 122 to bias terminal 123 such that signal voltage is effectively pushed down to a bias voltage level present at bias terminal 123 (LOW level). At least one effect can be that transducer by way of operating transistor 129 can control a level of voltage on signal line 132.

In some implementations sensor unit 120 includes a clock portion (not shown) to provide clocking to other portions of sensor unit 120 such as transducer 127 and/or sensor transceiver 126.

According to some embodiments, as exemplarily depicted in FIG. 2, coupling between controller unit 110 and sensor 120 is provided by communication path 130. Communication path 130 comprises a connection such as, for example, provided by wireline or by optical fibre. According to some embodiments at least a signal line 132 couples between sensor signal terminal 122 and controller unit signal terminal 112. In some embodiments signal line 132 interfaces with one or both of signal terminal 112 of controller unit 110 and signal terminal 122 of sensor 120, and, thus, signal line 132 directly connects between controller unit signal terminal 112 and signal terminal 122. In some implementations communication path 130 further comprises a supply voltage line 131 that is connected to a supply voltage source 101. Supply voltage line 131 couples between supply voltage terminal 111 of controller unit 110 and supply voltage terminal 121 of sensor 120. In some implementations communication path 130 further comprises a bias voltage line 133 that couples between bias voltage terminal 113 of controller unit 110 and bias voltage terminal 123 of sensor 120. Coupling between supply voltage terminal 111 of controller unit 110 and/or supply voltage terminal 121 of sensor 120, according to some embodiments, is provided by coupling supply voltage terminal 111 of controller unit 110 and/or supply voltage terminal 121 of sensor 120 to some voltage supply 101 of system 100. Coupling between bias terminal 113 of controller unit 110 and/or bias terminal 123 of sensor 120, according to some embodiments, is provided by coupling bias terminal 113 of controller unit 110 and/or bias terminal 123 of sensor 120 to some common bias of system 100 such as ground 103. In some embodiments supply voltage line 131 is dedicated to communication path 130 between control unit 110 and sensor unit 120. In other embodiments 130 supply voltage line 131 is shared with other equipment. Similarly, in some embodiments bias voltage line 133 is dedicated to communication path 130 between control unit 110 and sensor unit 120. In other embodiments 130 bias voltage line 133 is shared with other equipment. In some implementations, ground 103 provides bias voltage line 133, i.e., controller unit 110 and sensor unit 120 each connect to ground 103 which is shared between at least controller unit 110 and sensor unit 120.

According to some embodiments signalling in system 100 is performed by changing the level of the signal voltage on signal line 132 as will now be described in more detail.

Having regard to controller unit 110, in some implementations, microcontroller 117 issues a control signal via control output terminal 172. The control signal can, for example, be indicative of a trigger, challenge in a challenge-response scheme or other request that sensor unit 120 transmit measurement data to controller unit 110. A gate terminal of controller transistor 119 receives the control signal. The control signal causes controller transistor 119 of transceiver 116 to switch from OPEN state into a CLOSE state. In OPEN state provided a resistance. Now, in CLOSE state, transistor 119 provides for conductive coupling between signal terminal 112 and bias terminal 113. Consequently, the voltage level on signal line 132 drops from a level at supply voltage terminal 111 (HIGH level) to the voltage level on bias line 133 (LOW level). Thus, the voltage level at terminal 112, but also on signal line 132 and at terminal 122 of sensor unit 120 is set to ground 103. Correspondingly, a change of voltage level that occurs at signal terminal 112 is detected by the discrimination device of controller transceiver 116, i.e. in the example shown in FIG. 2, by comparator 118. In particular, comparator 118 detects a drop of voltage level at signal terminal 112 corresponding to a drop of voltage level on signal line 132 as a change with respect to a reference voltage. According to some embodiments the voltage drop as such, i.e., the change in voltage level at signal terminal 112 represents one bit of information to be transmitted via signal line 132. Thus, transceiver 116 can receive one bit of information and transmit the received information bit to data input terminal 171 of microcontroller 117, for example, for processing the received information bit.

According to some embodiments sensor unit 120 operates similarly to controller unit 110. Transducer 127 of sensor unit 120 can issue a measurement signal via measurement signal output terminal 272 that causes transistor 129 of transceiver 126 to switch into a CLOSE state. In CLOSE state, transistor 129 provides for conductive coupling between signal terminal 122 and bias terminal 123. Consequently, the voltage level on signal line 132 drops from the voltage level at the supply voltage terminal 123 (HIGH level) to the voltage level on bias line 133. According to some embodiments the voltage drop as such, i.e., the change in voltage level at signal terminal 122 represents one bit of information to be transmitted via signal line 132. Correspondingly, a change of voltage level that occurs at signal terminal 122 is detected by the discrimination device of controller transceiver 126, i.e. in the example shown in FIG. 2, by comparator 128. In particular, comparator 128 detects a drop of voltage level at signal terminal 122 corresponding to a drop of voltage level on signal line 132 from HIGH level to LOW level as a change with respect to a reference voltage. Consequently, comparator 128 outputs a signal to control input terminal 271 of transducer 127 that, for example, can be indicative of the request of microcontroller 117 that data be transmitted to controller unit 110. Thus, transceiver 126 can receive one bit of information and transmit the received information bit to control input terminal 271 of transducer 127, for example, to interpret the received information bit as in connection with a request to activate transducer 127.

It should be understood that, while the signalling operation of controller unit 110 and the signalling operation of sensor unit 120 essentially were separately described, in an implementation of system 100, controller unit 110 and sensor unit 120 are configured to communicatively interact, since a change of voltage level on signal line 132 from a HIGH level to a LOW level caused by switching operation of the transceiver 116, 126 of the one, is detected in operation of the transceiver 126, 116 of the other. Where, as described above, transceiver 126 of sensor unit 120 is configured to operate, in particular as far as transmitting and receiving of signals is concerned, like transceiver 116 of controller unit 110, communication path 130, in particular signal line 132, according to some embodiments of system 100, is configured to operate in a bidirectional mode. In some embodiments the bidirectional mode of operation is a half-duplex mode. In order to enable simultaneous operation of at least controller unit 110 and at least one sensor unit 120, i.e., in some implementations multiple sensor units 120a, . . . , 120d, according to some embodiments communication via communication path 130 is performed in accordance with a protocol.

Operation of system 100, according to some embodiments, is synchronized to a clock signal CLK provided by microcontroller 117. In some implementations clock signal CLK is derived from a system master clock governed, for example, by a clock quartz. Clock signal CLK is periodic. The length of one clock period defines a unit of time, herein referred to as 'tick'.

Signalling across communication path 130 can be accomplished by control of the voltage level on signal line 132 to form pulses. In some embodiments signalling, transmitted as pulses, represents information bitwise.

In some implementations a predetermined communication protocol ensures that microcontroller 117 can selectively control operation of at least one sensor unit 120 coupled, via communication path 130, to controller unit 110. According to the communication protocol, microcontroller 117 can address sensor unit 120 by first switching the voltage level on signal line 132 from HIGH to LOW for a predetermined number of ticks. Accordingly, transducer 127, being in receipt, at control input terminal 271, of the information about the change of voltage level from HIGH to LOW, takes into account a duration of time during that the voltage level on signal line 132 is set to LOW. If the duration lasts so long as to correspond to a predetermined interval recognized by this sensor unit 120 to be associated with this sensor unit 120, then transducer 127 activates measurement of a physical quantity that sensor unit 120 is configured to measure, for example, acceleration. Accordingly, transducer 127 outputs, at measurement signal output terminal 272, a measurement signal that causes sensor transceiver 126 to set the voltage level at sensor signal terminal 122 accordingly to LOW level, wherein, in some embodiments, a duration in terms of ticks corresponds to an amplitude of the measurement signal for the measured quantity. Further, after having reset the voltage level at sensor signal terminal 122 to HIGH level, sensor transceiver 126 can, for a predeterminedly fixed amount of time that in some embodiments lasts one tick to represent a bit equal to one, still set the voltage level at sensor signal terminal 122 again to LOW level, so as to represent cyclic redundancy check information. Also, at least according to some embodiments, after having transmitted cyclic redundancy check signalling and having reset the voltage level at sensor signal terminal 122 to HIGH level, transducer 127 can further set the voltage level at sensor signal terminal 122 to LOW level for a predetermined number of ticks representative of an END signal, so as to represent an end of transmission of measurement data.

According to some embodiments the predetermined communication protocol can define that the voltage level set at signal terminal 122 (and, in some embodiments, likewise also at signal terminal 112) for transmission via signal line 132 can represent more information than zero and one by allowing for additional voltage levels other than HIGH level and LOW level to represent digital values. For example, a digital binary representation can be configured to define a LOW level at a signal voltage of 0 V and a HIGH level at a signal voltage of 5 V. In another embodiment, a digital data representation of the signal defines multiple (N) non-LOW voltage levels, such as 1 V, 2 V, 3 V, 4V and 5 V. These embodiments can be configured to transmit one of N values wherein each value is associated with at different voltage level. Accordingly, in order to assign a voltage level of a received signal controller unit 110 in some implementations comprises a plurality of comparators, for example, N−1 comparators in the case of N voltage levels defined.

Transceiver 116 of controller unit 110 receives, via signal line 132, a received signal that represents, as the case may be, the measured quantity, cyclic redundancy check information and END signal. Accordingly, transceiver 116 outputs to data input terminal 121 of microcontroller 117 a data signal that represents the measurement information, outputs cyclic redundancy check information to data input terminal 121 of microcontroller 117, and outputs an END signal to data input terminal 121 of microcontroller 117. According to some implementations microcontroller 117 processes data with respect to measurement information, cyclic redundancy check information and/or END signalling.

According to the predetermined protocol, control unit 110 structures requests or challenges of a challenge-response scheme for output to devices coupled to control unit 110 such as sensor unit 120. For example, control unit 110 structures each challenge in a control load packet. In some embodiments each control load packet has the same length. In other embodiments not all control load packets need to have the same length. It should be understood that according to some implementations the wording 'packet' encompasses the data to be transmitted without any overhead such as a packet identifier, an end-of-packet indicator and/or other control information.

According to some embodiments, control unit 110 assigns and/or distributes each control load packet to one or more control transmission slots, wherein a control transmission slot herein is also referred to as 'signal frame'. According to the communication protocol in some embodiments the length of the control transmission slot does not exceed a predetermined maximum. In some implementations the control transmission slot has a fixed length. In order to enable use of signal line 132 for transmission of measurement signals from sensor unit 120 to controller unit 110, controller unit 110 schedules, according to some implementations predeterminedly in accordance with the communication protocol, control transmission slots reserved for the purpose of transmission of control information at predetermined intervals of time. Thus, seen from the point of view of sensor unit 120, control transmission slots predeterminedly interrupt transmission of measurement signals. It should be understood, however, that according to the implementations disclosed herein complexity and/or amount of control information need not be limited to what can be transmitted during a single control transmission slot. While transmission of measurement signals may be interrupted, nevertheless, due to the limited maximum length of the control transmission slots, transmission of signals from sensor unit 120 to control unit 110 is not unacceptably delayed.

According to communication protocols in some implementations, the signal frame encompasses a header portion, for example to transmit start bits of the signal frame. Further, according to the communication protocol, the signal frame includes a data field portion, for example to transmit control load from control unit 110 to sensor unit 120. In some embodiments the signal frame also includes an end control portion, for example to transmit cyclic redundancy check bits. In accordance with the techniques disclosed herein, where the data field portion is too short to accept all control load of one control load packet to be transmitted, control unit 110 distributes the control load comprised in the one control load packet onto more than one signal frame. Thus, several signal frames successively transmitted from control unit 110 to sensor unit 120 may include control load that is associated with a single challenge and/or control load packet.

In some implementations control load encompasses challenge information that represents a challenge in a challenge-response scheme to one or more sensor units 120 communicatively coupled to control unit 110 via communication path 130. In some embodiments control load encompasses response information that represents a response to a challenge in a challenge-response scheme put to control unit 110 by sensor unit 120. According to some implementations control load includes configuration information to sensor unit 120. Examples of control load according to some embodiments are characteristic curve data, timing data such as synchronisation data for use in successive approximation for clock synchronisation of controller unit 110 and sensor unit 120, and/or key data for use in cryptographic processing. In some embodiments control load comprises authentication information such as a hash that identifies control unit 110 as acceptable to receive requests and/or challenges from control unit 110. According to some implementations control load comprises a key component to establish a common key in order to provide a secure communication channel on communication path 130 or other coupling between sensor unit 120 and control unit 110 or, in some embodiments, another device coupled to control unit 110.

Figure 3:
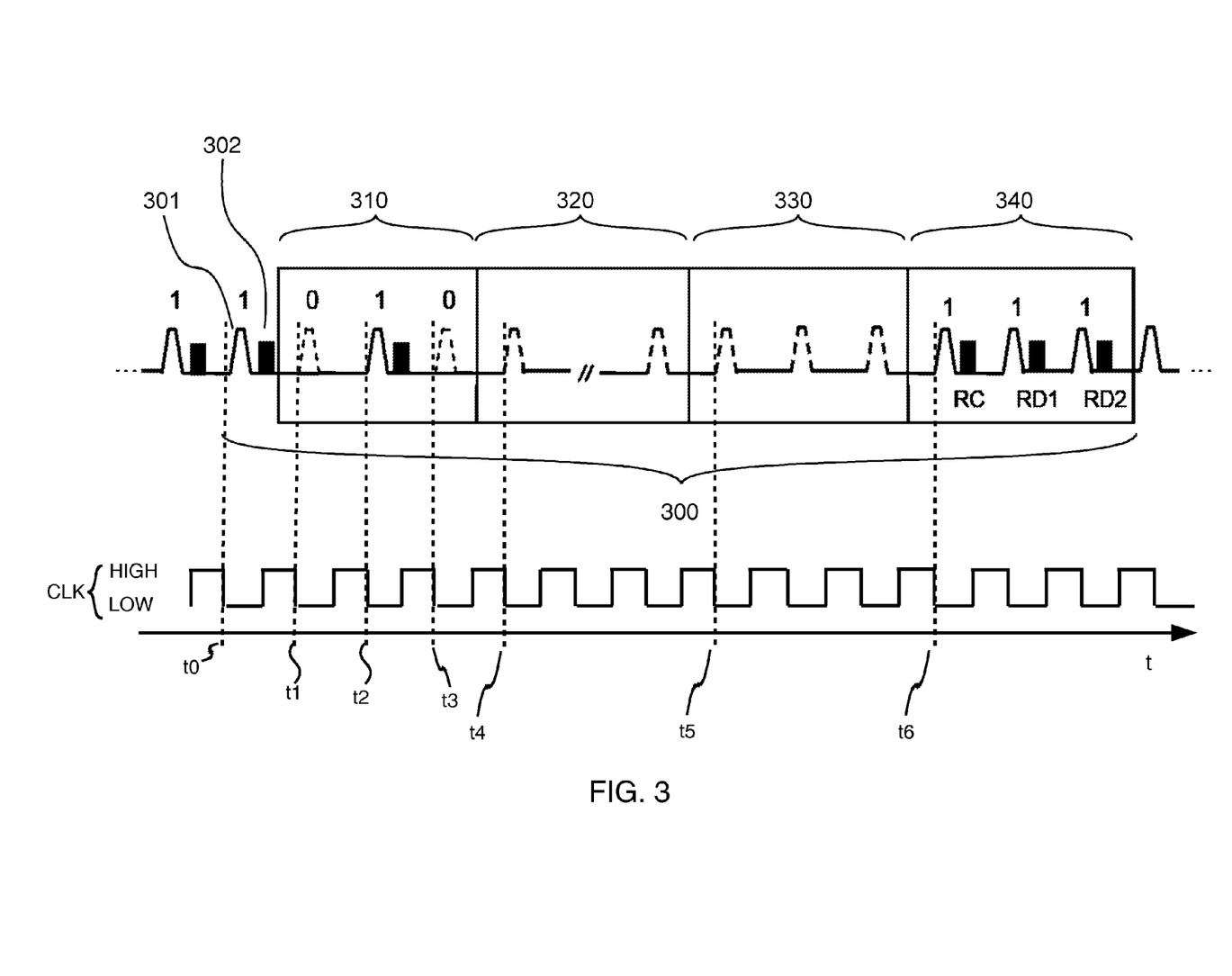
FIG. 3 is a timing diagram that illustrates timing of exemplary signals communicated in the system illustrated in FIGS. 1 and 2 according to some embodiments using pulses to communicate information.

FIG. 3 is a timing diagram that illustrates timing of exemplary signals communicated in the system illustrated in FIGS. 1 and 2 according to some embodiments using pulses to communicate information. In some implementations, while pulses are each of a same length, the signalling is accomplished by a setting voltage level on signal line 132 in accordance with a pattern of pulses and non-pulses, whereby information can be transmitted bitwise. An exemplary use of this protocol is illustrated in FIG. 3 that shows one cycle 300 (not drawn to scale) of communication between control unit 110 and one sensor unit 120a via communication path 130. A time window 300 of predetermined length in terms of ticks is given to accomplish the communication. In an exemplary implementation, also using communication path 130, another sensor unit 120b that is also coupled to control unit 110 can meanwhile also communicate with control unit 110.

First, at time t0, conditioning starts wherein microcontroller 117 brings control unit 110 and, more particularly, transceiver 116 and communication path 130 into a start condition. Transceiver 116 transmits a first pulse 301 onto signal line 132. After a predetermined pulse width, transceiver 116 ceases to transmit first pulse 301 and thereby gives the one sensor unit 120a a break to transmit a pulse 302 to control unit 110. In some implementations pulse 302 is a response to a challenge represented by first pulse 301. However, it should also be understood that the another sensor unit 120b, i.e., other than this one sensor unit 120a presently identified by controller unit 110, can use the break in transmission from control unit 110 to this one sensor unit 120a to transmit information, for example, measurement data taken at the another sensor unit 120b.

Next, during a start phase 310, microcontroller 117 requests transceiver 116 to transmit a start bit sequence '010' to this one sensor unit 120a whereby, for example, in some implementations, this one sensor unit 120a can identify a request as being directed to this one sensor unit 120a. Accordingly, transceiver, at time t1, allows voltage on signal line 132 to stay at HIGH level, at time t2 sets voltage on signal line 132 to LOW level and, at time t3, allows voltage on signal line 132 to stay at HIGH level, respectively. Thus, the binary sequence '010' is represented. Accordingly, at this one sensor unit 120a signalling is received and sensor transceiver 126 provides the bit sequence to transducer 127. Transducer 127 recognizes that measurement should be conducted and accordingly outputs measurement values to sensor transceiver 126 for transmission to control unit 110.

Next, at time t4, a data phase 320 begins. During data phase 320 a data field is transmitted from control unit 110 to this one sensor unit 120a. Transmission is in accordance with the predetermined transmission protocol and performed like the transmission of signalling and bit values previously described with reference to the conditioning and with reference to transmissions performed during start phase 310.

At time t5, a cyclic redundancy check phase 320 begins. During cyclic redundancy check phase 330 control unit 110 transmits cyclic redundancy check bits to this one sensor unit 120a. Transmission is in accordance with the predetermined transmission protocol and performed, for example, like the transmission of bit values previously described with reference to transmission of bits performed during start phase 310.

At time t6, a sensor response phase 340 begins. During sensor response phase 340, according to some implementations, control unit 110 transmits bits to this one sensor unit 120a. In some implementations control unit 110 can already condition the another sensor unit 120b for transmission of measurement data. Meanwhile, this one sensor unit 120a which was identified during start phase 310, transmits data, for example measurement data, via communication path 130 to control unit 110 as indicated in FIG. 3 by blocks designated RC, RD1, RD2. Transmission of data is in accordance with the predetermined transmission protocol and performed, for example, like the transmission of bit value 302 previously described with reference to conditioning. Thus, one challenge response cycle 300 of communication between control unit 110 and this one sensor unit 120a is completed.

Figure 4:
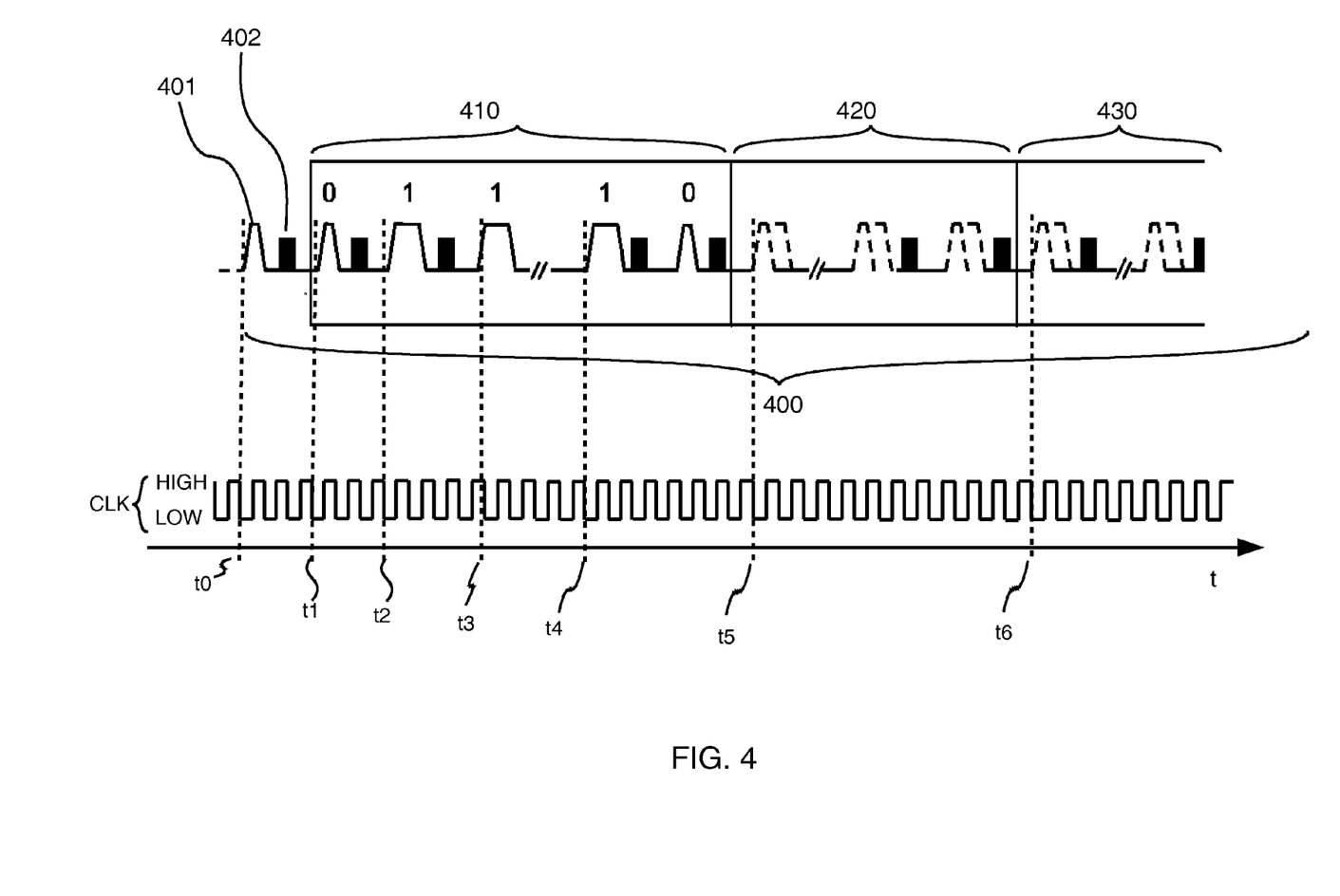
FIG. 4 is a timing diagram that illustrates timing of exemplary signals communicated in the system illustrated in FIGS. 1 and 2 according to some embodiments using signal pulse width to communicate information.

According to some embodiments information is represented by duration or length of the voltage level on signal line 132 being set to a predetermined level for a duration, herein also called pulse width. FIG. 4 is a timing diagram that illustrates timing of exemplary signals communicated in the system illustrated in FIGS. 1 and 2 according to some embodiments using pulse width to communicate information. According to some embodiments, the pulse width is essentially a multiple of ticks or otherwise synchronised to clock signal CLK and predetermined to represent an associated value to be transmitted. Thus, in some embodiments, an implementation of the half-duplex mode in system 100 is based on a short pulse width modulation code protocol.

FIG. 4 illustrates one cycle 400 (not drawn to scale) of communication between control unit 110 and one sensor unit 120a via communication path 130 using short pulse width modulation code protocol. Further, in an exemplary implementation, also using communication path 130, another sensor unit 120b, that is also coupled to control unit 110, can meanwhile also communicate with control unit 110. A time window 400 is formed to accomplish the communication. However, unlike the embodiments illustrated in FIG. 3, in the case of the communication illustrated in FIG. 4, a duration or length of the time window 400 is not necessarily predetermined in order to accommodate variable pulse length. Otherwise, communication is performed similarly to the procedure described above with reference to FIG. 3 as will now become apparent when further disclosing the example illustrated in FIG. 4.

First, at time t0, conditioning starts wherein microcontroller 117 brings control unit 110 and, more particularly, transceiver 116 and communication path 130 into a start condition. Transceiver 116 transmits a first pulse 401 onto signal line 132. After a predetermined pulse width, transceiver 116 ceases to transmit first pulse 401 and thereby gives the one sensor unit 120a a break to transmit a pulse 402 to control unit 110. In some implementations pulse 402 is a response to a challenge represented by first pulse 401. However, it should also be understood that the another sensor unit 120b, i.e., other than this one sensor unit 120a presently identified by controller unit 110, can use the break in transmission from control unit 110 to this one sensor unit 120a to transmit information, for example measurement data taken at the another sensor unit 120b.

Next, during a start phase 410, microcontroller 117 requests transceiver 116 to transmit a start bit sequence '011 . . . 10' to this one sensor unit 120a whereby, for example, in some implementations, this one sensor unit 120a can identify a request as being directed to this one sensor unit 120a. Accordingly, controller transceiver 116, at time t1, first sets voltage on signal line 132 to LOW level for one clock period to represent the bit value zero. At time t2, controller transceiver 116 sets voltage on signal line 132 again to LOW level, but does so—crucially—longer than before, for example for two clock periods, to represent the bit value one. Again, at time t3, controller transceiver 116 sets voltage on signal line 132 to LOW level for two clock periods, thereby again to represent the bit value one. Also at time t3, controller transceiver 116 sets voltage on signal line 132 to LOW level for two clock periods, thereby again to represent the bit value one. Lastly, during start phase 410, controller transceiver 116 sets voltage on signal line 132 to LOW level for one clock period, thereby again to represent the bit value zero. Thus, the binary sequence '011 . . . 10' is represented. Accordingly, at this one sensor unit 120a signalling is received and sensor transceiver 126 provides the bit sequence to transducer 127. Transducer 127 recognizes that measurement should be conducted and accordingly outputs measurement values to sensor transceiver 126 for transmission to control unit 110.

Next, at time t4, a data phase 420 begins. During data phase 420 a data field is transmitted from control unit 110 to this one sensor unit 120a. Transmission is in accordance with the predetermined transmission protocol and performed like the transmission of signalling and bit values previously described with reference to the conditioning and with reference to transmissions performed during start phase 410.

At time t5, a cyclic redundancy check phase 430 begins. During cyclic redundancy check phase 430 control unit 110 transmits cyclic redundancy check bits to this one sensor unit 120a. Transmission is in accordance with the predetermined transmission protocol and performed, for example, like the transmission of bit values previously described with reference to transmission of bits performed during start phase 410.

At time t6, a sensor response phase begins. During sensor response phase, according to some implementations, control unit 110 transmits bits to this one sensor unit 120a. In some implementations control unit 110 can already condition the another sensor unit 120b for transmission of measurement data. Meanwhile, this one sensor unit 120a which was identified during start phase 410, transmits data, for example measurement data, via communication path 130 to control unit 110. Transmission of data is in accordance with the predetermined transmission protocol and performed, for example, like the transmission of bit value 402 previously described with reference to conditioning. Thus, one challenge response cycle 400 of communication between control unit 110 and this one sensor unit 120a is completed.

Described herein are embodiments that relate to a method for data acquisition in a system having a plurality of data acquisition units and a controller coupled to the plurality of data acquisition units by a pair of wires. In some embodiments the controller is provided as, or forms part of, a control unit. The method comprises providing a resistive element controllable to change resistance between the pair of wires for use in broadcasting via the pair of wires. For example, a transistor forms the resistive element. Further, the method, according to some embodiments, comprises distributing a control load across a plurality of signal frames, the control load including a representation of a request for data from a first data acquisition unit in the plurality of data acquisition units or otherwise being indicative of the request. Some embodiments include broadcasting the plurality of signal frames, wherein consecutive frames are spaced apart to form a time window. The method includes, during the time window, via the pair of wires, receiving second data from a second data acquisition unit in the plurality of data acquisition units. At least one effect can be in some embodiments to enable reception of acquired data in the space between two consecutive signal frames, irrespective of an amount of control load exceeding capacity of a single signal frame. At least one other effect can be in some implementations to enable, after transmission of request for acquired data from the controller to the data acquisition unit has begun, still reception, at the controller, of data acquired by a first data acquisition unit.

According to some embodiments the broadcasting includes providing a third wire configured to hold a supply voltage and to couple the controller to the plurality of acquisition units collectively by the pair of wires and the third wire. In some implementations changing a voltage signal on a signal wire of the pair of wires from a first voltage to a second voltage indicates a boundary of a signal frame.

According to some embodiments the method comprises controlling the resistive element to hold the first voltage on the signal wire at a high level and, according to a switch signal supplied to the resistive element, to switch to the second voltage at a low level.

In some implementations the broadcasting includes holding the voltage signal at the low level for a predetermined duration, wherein the predetermined duration is selected from a plurality of predetermined durations associated with different requests. According to some embodiments the predetermined duration is segmented and exceeds the duration of a single signal frame. In some embodiments the predetermined duration is segmented and exceeds the duration of a single signal frame.

In some embodiments the method disclosed herein comprises using the first data acquisition unit to pick up a first analog signal, wherein the first data represent information acquired with the first analog signal.

According to some embodiments the method disclosed herein comprises using the second data acquisition unit to pick up a second analog signal, wherein the second data represent information acquired with the second analog signal.

According to some embodiments of the method the second data indicate authenticity of the second data acquisition unit.

In another aspect disclosed herein is a controller for coupling to a plurality of data acquisition units by a pair of wires. The controller in some embodiments is provided as, or forms part of, a control unit. The controller is configured to control, for use in broadcasting via the pair of wires, a resistive element to change resistance between the pair of wires. In some embodiments, the resistive element is provided by, or includes, a transistor. In an embodiment the controller is configured to distribute a control load across a plurality of signal frames, the control load being indicative of a request for data from a first data acquisition unit in the plurality of data acquisition units. According to some embodiments the controller is further configured to broadcast the plurality of signal frames, wherein consecutive frames are spaced apart to form a time window. In some implementations the controller is further configured to receive, during the time window, via the pair of wires, second data from a second data acquisition unit in the plurality of data acquisition units. At least one effect can be in some embodiments to enable reception of acquired data in the space between two consecutive signal frames, irrespective of an amount of control load exceeding capacity of a single signal frame. At least one other effect can be in some implementations to enable, after transmission of request for acquired data from the controller to the data acquisition unit has begun, still reception, at the controller, of data acquired by a first data acquisition unit.

According to some embodiments the controller is configured to be coupled to the plurality of data acquisition units collectively by the pair of wires and a third wire, wherein the third wire is configured to hold a supply voltage. In some implementations the controller is further configured to indicate a boundary of a signal frame by changing a voltage signal on a signal wire of the pair of wires from a first voltage to a second voltage.

According to some embodiments the controller is further configured to control the resistive element and configured to hold the first voltage on the signal wire at a high level. In an embodiment the controller is configured to supply a switch signal to the resistive element to switch the voltage signal to the second voltage at a low level. In some embodiments the controller is configured to supply the switch signal to the resistive element for a predetermined duration during broadcasting. In some implementations the controller is configured to hold the voltage signal at the low level, wherein the predetermined duration is selected from a plurality of predetermined durations associated with different requests. According to some embodiments the predetermined duration is segmented and exceeds the duration of single signal frame.

Another solution provides a system for data acquisition. The system comprises a controller, a plurality of data acquisition units, a pair of wires for coupling the controller to the plurality of data acquisition units, and a controllable resistive element between the pair of wires. According to some embodiments the controller is coupled to the controller by a pair of wires. According to some embodiments disclosed herein the controller is configured to distribute a control load across a plurality of signal frames, the control load being indicative of a request for data from a first data acquisition unit in the plurality of data acquisition units. The controller in some embodiments is further configured to control, for example, for use in broadcasting via the pair of wires, the resistive element to change resistance between the pair of wires. According to some implementations the controller is further configured to broadcast the plurality of signal frames. In some implementations the controller is configured to perform broadcasting via the pair of wires. In some implementations the controller is configured to perform the broadcasting by broadcasting consecutive frames are spaced apart to form a time window. In some implementations the controller is further configured to receive, during the time window, in particular via the pair of wires, second data from a second data acquisition unit in the plurality of data acquisition units. At least one effect can be in some embodiments to enable reception of acquired data in the space between two consecutive signal frames, irrespective of an amount of control load exceeding capacity of a single signal frame. At least one other effect can be in some implementations to enable, after transmission of request for acquired data from the controller to the data acquisition unit has begun, still reception, at the controller, of data acquired by a first data acquisition unit.

According to some embodiments the system further comprises a third wire configured to couple the controller to the plurality of data acquisition units collectively with the pair of wires. In some implementations the third wire is configured to hold a supply voltage. In some implementations the controller is configured to indicate a boundary of a signal frame by changing a voltage signal on a signal wire of the pair of wires from a first voltage to a second voltage. Further, the controller can be configured to control the resistive element to hold the first voltage on the signal wire at a high level. The controller can further be configured to supply a switch signal to the resistive element to switch the voltage signal to the second voltage at a low level. In some implementations the controller is configured to supply a switch signal to the resistive element to switch the voltage signal to the second voltage at a low level. In some embodiments the controller is configured to hold, for a predetermined duration during broadcasting, the voltage signal at the low level, wherein the predetermined duration is selected from a plurality of predetermined durations associated with different requests. According to some implementations the predetermined duration is segmented and exceeds the duration of single signal frame. In some embodiments each data acquisition unit in the plurality of data acquisition units is configured to pick up an analog signal associated with the data acquisition unit. According to an implementation the data represent information acquired with the associated analog signal. In some embodiments the second data indicate authenticity of the second data acquisition unit.

For the purposes of this disclosure and the claims, the terms 'coupled' and 'connected' may be used to describe how various elements interface. Such described interfacing of various elements may be either direct or indirect. The wording 'coupled' as used herein encompasses 'connected' and 'directly connecting' by some connection medium such as wireline or an electrical circuit element. Further, the wording 'coupled' as used herein can disclose a functional relation between the interfaced elements such as specifically expressed by the wording 'communicatively coupled' to represent any connection or other coupling that enables communication between the interfaced elements. The word 'exemplary' is used herein to mean serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion. The term 'techniques,' for instance, may refer to one or more devices, apparatuses, systems, methods, articles of manufacture, and/or computer-readable instructions as indicated by the context described herein.

It is to be understood that the features of the various embodiments described herein may be combined with each other, unless specifically noted otherwise. Although specific embodiments have been illustrated and described herein, it will be appreciated by those of ordinary skill in the art that a variety of alternate and/or equivalent implementations may be substituted for the specific embodiments shown and described without departing from the scope of the present invention. For example, where some implementations were described above with respect to a first and a second functionality, other un-illustrated implementations can include only the first functionality (not second functionality) or can include only the first functionality (not the second functionality). Other permutations and combinations of the above-disclosed concepts are also contemplated as falling within the scope of the disclosure. The disclosure includes all such modifications and alterations and is limited only by the scope of the following claims. This application is intended to cover any adaptations or variations of the specific embodiments discussed herein. It is intended that this invention be limited only by the claims and the equivalents thereof. The implementations herein are described in terms of exemplary embodiments. Exemplary implementations/embodiments discussed herein may have various components collocated. However, it should be appreciated that individual aspects of the implementations may be separately claimed and one or more of the features of the various embodiments may be combined. The order in which the embodiments/implementations and methods/processes are described is not intended to be construed as a limitation, and any number of the described implementations and processes may be combined. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. While a particular feature of the disclosure may have been disclosed with respect to only one of several implementations, such feature may be combined with one or more other features of the other implementations as may be desired and advantageous for any given or particular application.

One embodiment includes a processing means, for example a computer, or a programmable logic device, configured to or adapted to perform one of the methods described herein. One embodiment includes a computer having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, or the like. In general, any apparatus capable of implementing a state machine that is in turn capable of implementing the methodology described and illustrated herein may be used to implement the various methods, protocols and techniques according to the implementations. The disclosed arrangements may be implemented partially or fully in hardware using logic circuits or VLSI design. The communication arrangements, procedures and protocols described and illustrated herein as well as variations thereof may be readily implemented in hardware and/or software using any known or later developed systems or structures, devices and/or software by those of ordinary skill in the applicable art from the functional description provided herein and with a general basic knowledge of the computer arts. The disclosed procedures may be readily implemented in software that can be stored on a computer-readable storage medium, executed on a programmed general-purpose computer with the co-operation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

What is claimed is:

1. A method for data acquisition in a system having a plurality of data acquisition units and a controller coupled to the plurality of data acquisition units by a pair of wires, the method comprising:
   providing a resistive element controllable to change resistance between the pair of wires for use in broadcasting via the pair of wires;
   distributing a control load across a plurality of signal frames, the control load being indicative of a request for data from a first data acquisition unit in the plurality of data acquisition units;
   broadcasting the plurality of signal frames, wherein consecutive frames are spaced apart to form a time window; and
   during the time window, via the pair of wires, receiving second data from a second data acquisition unit in the plurality of data acquisition units,
   wherein the broadcasting includes:
      providing a third wire configured to hold a supply voltage and to couple the controller to the plurality of acquisition units collectively by the pair of wires and the third wire; and
      wherein changing a voltage signal on a signal wire of the pair of wires from a first voltage to a second voltage indicates a boundary of a signal frame.

2. The method of claim 1, further comprising controlling the resistive element to hold the first voltage on the signal wire at a high level and, according to a switch signal supplied to the resistive element, to switch to the second voltage at a low level.

3. The method of claim 2, wherein the broadcasting includes:
   holding the voltage signal at the low level for a predetermined duration, wherein the predetermined duration is selected from a plurality of predetermined durations associated with different requests.

4. The method of claim 3, wherein the predetermined duration is segmented and exceeds the duration of a single signal frame.

5. The method of claim 1, further comprising:
   using the first data acquisition unit to pick up a first analog signal, wherein the first data represent information acquired with the first analog signal.

6. The method of claim 1, further comprising:
   using the second data acquisition unit to pick up a second analog signal, wherein the second data represent information acquired with the second analog signal.

7. The method of claim 1, wherein the second data indicate authenticity of the second data acquisition unit.

8. A controller for coupling to a plurality of data acquisition units by a pair of wires,
   wherein the controller is configured to control, for use in broadcasting via the pair of wires, a resistive element to change resistance between the pair of wires,
   wherein the controller is configured to distribute a control load across a plurality of signal frames, the control load being indicative of a request for data from a first data acquisition unit in the plurality of data acquisition units,
   wherein the controller is further configured to broadcast the plurality of signal frames, wherein consecutive frames are spaced apart to form a time window,
   wherein the controller is further configured to receive, during the time window, via the pair of wires, second data from a second data acquisition unit in the plurality of data acquisition units,
   wherein the controller is configured to be coupled to the plurality of data acquisition units collectively by the pair of wires and a third wire, wherein the third wire is configured to hold a supply voltage,
   wherein the controller is further configured to indicate a boundary of a signal frame by changing a voltage signal on a signal wire of the pair of wires from a first voltage to a second voltage.

9. The controller of claim 8, wherein the controller further configured to control the resistive element and configured to hold the first voltage on the signal wire at a high level and, wherein the controller is configured to supply a switch signal to the resistive element to switch the voltage signal to the second voltage at a low level.

10. The controller of claim 8, wherein the controller is configured to hold, for a predetermined duration during broadcasting, the voltage signal at the low level, wherein the predetermined duration is selected from a plurality of predetermined durations associated with different requests.

11. The controller of claim 10, wherein the predetermined duration is segmented and exceeds the duration of single signal frame.

12. A system for data acquisition, the system comprising a controller, coupled to the controller by a pair of wires, a plurality of data acquisition units, a pair of wires for coupling the controller to the plurality of data acquisition units, a controllable resistive element between the pair of wires, and a third wire configured to couple the controller to the plurality of data acquisition units collectively with the pair of wires,
   wherein the controller is configured to distribute a control load across a plurality of signal frames, the control load being indicative of a request for data from a first data acquisition unit in the plurality of data acquisition units,
   wherein the controller is further configured to control, for use in broadcasting via the pair of wires, the resistive element to change resistance between the pair of wires,
   wherein the controller is further configured to broadcast, via the pair of wires, the plurality of signal frames, wherein consecutive frames are spaced apart to form a time window,
   wherein the controller is further configured to receive, during the time window, via the pair of wires, second data from a second data acquisition unit in the plurality of data acquisition units,
   wherein the third wire is configured to hold a supply voltage, and
   wherein the controller is configured to indicate a boundary of a signal frame by changing a voltage signal on a signal wire of the pair of wires from a first voltage to a second voltage.

13. The system of claim 12, wherein the controller is further configured to control the resistive element to hold the first voltage on the signal wire at a high level and,
   wherein the controller is configured to supply a switch signal to the resistive element to switch the voltage signal to the second voltage at a low level.

14. The system of claim 12, wherein the controller is configured to hold, for a predetermined duration during broadcasting, the voltage signal at the low level, wherein the predetermined duration is selected from a plurality of predetermined durations associated with different requests.

15. The system of claim 14, wherein the predetermined duration is segmented and exceeds the duration of single signal frame.

16. The system of claim 12, wherein each data acquisition unit in the plurality of data acquisition units is configured to pick up an analog signal associated with the data acquisition unit, wherein the data represent information acquired with the associated analog signal.

17. The system of claim 12, wherein the second data indicate authenticity of the second data acquisition unit.

18. A method for data acquisition in a system having a plurality of data acquisition units and a controller coupled to the plurality of data acquisition units by a pair of wires, the method comprising:
- providing a resistive element controllable to change resistance between the pair of wires for use in broadcasting via the pair of wires;
- distributing a control load across a plurality of signal frames, the control load being indicative of a request for data from a first data acquisition unit in the plurality of data acquisition units;
- broadcasting the plurality of signal frames, wherein consecutive frames are spaced apart to form a time window;
- during the time window, via the pair of wires, receiving second data from a second data acquisition unit in the plurality of data acquisition units; and
- using the first or the second data acquisition units to pick up an analog signal, wherein the data received from the data acquisition unit represent information acquired with the analog signal.

19. A method for data acquisition in a system having a plurality of data acquisition units and a controller coupled to the plurality of data acquisition units by a pair of wires, the method comprising:
- providing a resistive element controllable to change resistance between the pair of wires for use in broadcasting via the pair of wires;
- distributing a control load across a plurality of signal frames, the control load being indicative of a request for data from a first data acquisition unit in the plurality of data acquisition units;
- broadcasting the plurality of signal frames, wherein consecutive frames are spaced apart to form a time window; and
- during the time window, via the pair of wires, receiving second data from a second data acquisition unit in the plurality of data acquisition units,
- wherein the second data indicate authenticity of the second data acquisition unit.

20. A system for data acquisition, the system comprising a controller, coupled to the controller by a pair of wires, a plurality of data acquisition units, a pair of wires for coupling the controller to the plurality of data acquisition units, and a controllable resistive element between the pair of wires,
- wherein the controller is configured to distribute a control load across a plurality of signal frames, the control load being indicative of a request for data from a first data acquisition unit in the plurality of data acquisition units,
- wherein the controller is further configured to control, for use in broadcasting via the pair of wires, the resistive element to change resistance between the pair of wires,
- wherein the controller is further configured to broadcast, via the pair of wires, the plurality of signal frames, wherein consecutive frames are spaced apart to form a time window,
- wherein the controller is further configured to receive, during the time window, via the pair of wires, second data from a second data acquisition unit in the plurality of data acquisition units,
- wherein each data acquisition unit in the plurality of data acquisition units is configured to pick up an analog signal associated with the data acquisition unit, wherein the data represent information acquired with the associated analog signal.

21. A system for data acquisition, the system comprising a controller, coupled to the controller by a pair of wires, a plurality of data acquisition units, a pair of wires for coupling the controller to the plurality of data acquisition units, and a controllable resistive element between the pair of wires,
- wherein the controller is configured to distribute a control load across a plurality of signal frames, the control load being indicative of a request for data from a first data acquisition unit in the plurality of data acquisition units,
- wherein the controller is further configured to control, for use in broadcasting via the pair of wires, the resistive element to change resistance between the pair of wires,
- wherein the controller is further configured to broadcast, via the pair of wires, the plurality of signal frames, wherein consecutive frames are spaced apart to form a time window,
- wherein the controller is further configured to receive, during the time window, via the pair of wires, second data from a second data acquisition unit in the plurality of data acquisition units,
- wherein the second data indicate authenticity of the second data acquisition unit.

* * * * *

UNITED STATES PATENT AND TRADEMARK OFFICE
CERTIFICATE OF CORRECTION

PATENT NO. : 10,303,638 B2  
APPLICATION NO. : 14/328968  
DATED : May 28, 2019  
INVENTOR(S) : A. Kolof Page 1 of 1

It is certified that error appears in the above-identified patent and that said Letters Patent is hereby corrected as shown below:

In the Claims

Column 19, Line 43 (Claim 5, Line 3) please change "first data represent" to -- data represent --

Signed and Sealed this
Thirtieth Day of July, 2019

Andrei Iancu
*Director of the United States Patent and Trademark Office*